March 8, 1960 W. W. WELCOME 2,928,040
SWEEP GENERATING CIRCUITS FOR CATHODE RAY OSCILLOGRAPHS
Filed Nov. 23, 1956
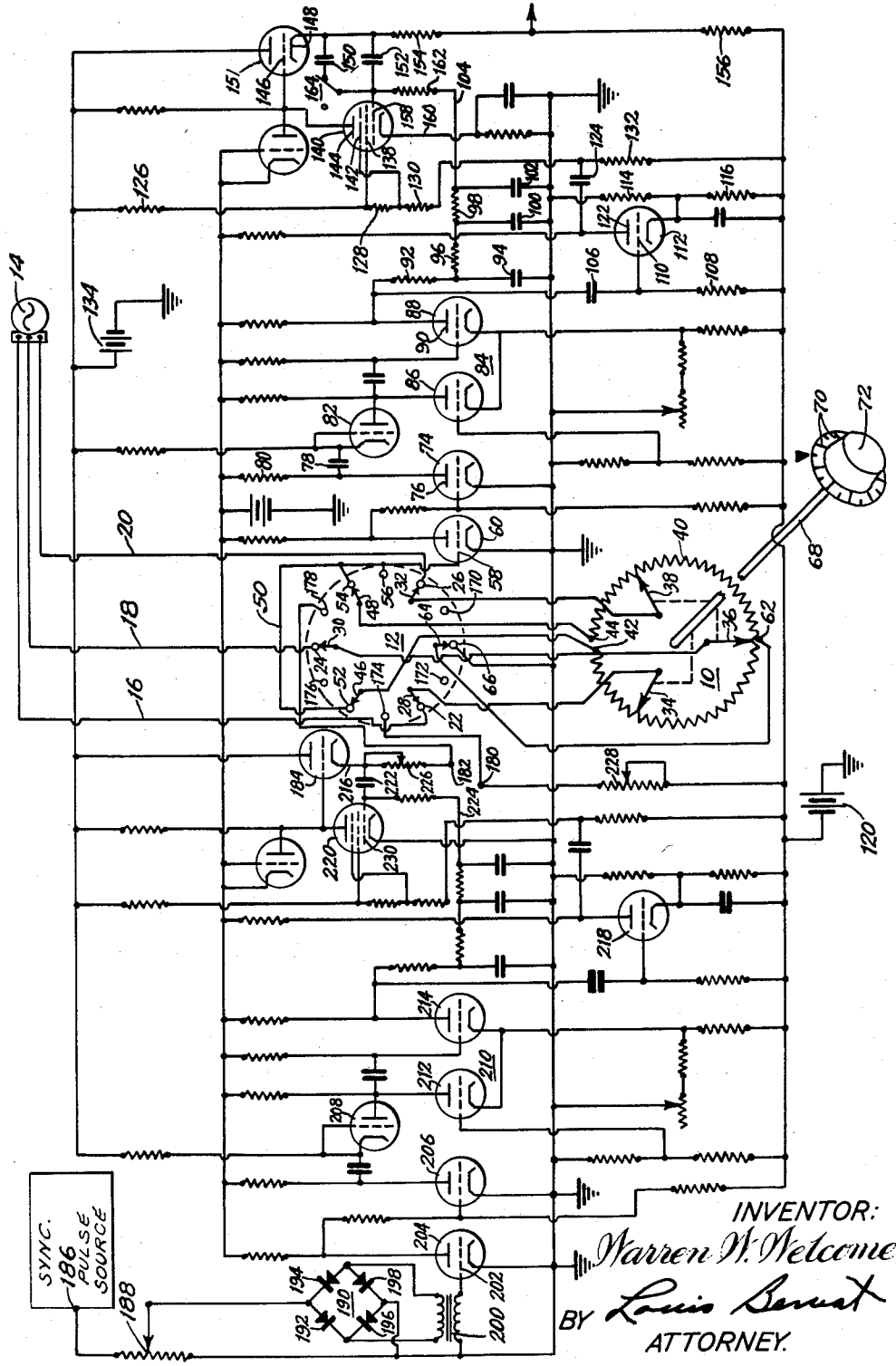
INVENTOR:
Warren W. Welcome,
BY Louis Bennet
ATTORNEY.

United States Patent Office 2,928,040
Patented Mar. 8, 1960

2,928,040

SWEEP GENERATING CIRCUITS FOR CATHODE RAY OSCILLOGRAPHS

Warren W. Welcome, Berkeley, Calif., assignor to Land-Air, Inc., Chicago, Ill., a corporation of Illinois Application November 23, 1956, Serial No. 624,050

9 Claims. (Cl. 324—16)

This invention relates generally to improvements in sweep generating circuits for cathode ray oscillographs and more particularly to improvements in means for synchronizing sweep generating circuits of the type adapted for use in engine analyzers and the like.

It is known in the art to employ test apparatus including a cathode ray oscillograph for the measurement and observation of various transient phenomena, as for example, in the electrical circuits of internal combustion engines for aircraft, automobiles and other power operated vehicles.

Normally the sweep or time base of the oscillograph is synchronized with the cyclical operation of the engine to the end that traces or indications representing engine functions may be observed. Due to the inability of conventional cathode ray oscillographs to maintain a sweep of constant amplitude over the relatively wide range of engine speeds generally attained by the devices tested, it has been necessary to provide the cathode ray oscillograph with specially designed sweep circuits capable of compensating for the differences in engine speed and thereby maintaining the sweep amplitude constant throughout the range of engine speed variations. Constant amplitude sweep generating circuits which may advantageously be utilized for this purpose are disclosed in my copending application Serial No. 624,049, filed November 23, 1956.

Many of the problems raised in synchronizing the oscillograph sweep from the engine have not been satisfactorily met in prior art systems. Generally it has been the practice to utilize synchronizing pulses from a fixed single point in the engine cycle or from a plurality of fixed points, such as from each spark plug in the ignition system. The lack of flexibility which has characterized these prior art systems has proved to be a serious handicap in the observation of engine functions which occur at times in the engine cycle other than the firing times of the spark plugs.

Accordingly, it is a general object of this invention to provide improved means for synchronizing the sweep output of a constant amplitude sweep generator adapted for use in an engine analyzer.

It is a further object to provide an improved sweep generator for an engine analyzer adapted to be selectively synchronized from a single point in the engine cycle or, alternatively, from an auxiliary multiphase generator associated with the engine.

It is a still further object of this invention to provide an improved sweep generator for an engine analyzer which, although synchronized from a single point in the engine cycle, may be adjusted to initiate the sweep at any desired point in the engine cycle.

It is another object of this invention to provide an improved sweep generating circuit for an engine analyzer having means to provide multipoint triggering of the sweep while the analyzer is being synchronized from a single point in the engine cycle.

It is still another object of this invention to provide a sweep generator for an engine analyzer in which the phase relations between the engine cycle and the sweep triggering point may be varied as desired so that the sweep may be initiated at any point on the engine cycle to identify signals representing engine functions which may be displayed on the cathode ray oscillograph of the analyzer.

It is still another object of this invention to provide improved synchronizing means for an engine analyzer sweep generator which is characterized by its flexibility, its reliability, and its economy of manufacture and operation.

These and other objects are realized in accordance with a specific illustrative embodiment of the invention which advantageously is adapted for use in the testing of electrical circuits of the type embodied in internal combustion engines and the like. It will be understood that although the invention will be described as utilized for the generation of sawtooth waveforms to be used as the sweep in an engine analyzer, this is in no sense limiting since the invention manifestly can be adapted for a wide variety of other uses.

When used with an engine analyzer the invention comprises a primary constant amplitude sweep generating circuit which can be synchronized by a multiphase signal generator associated with the engine or, alternatively, from a secondary constant amplitude sweep analyzer circuit triggered by a single pulse or step function occurring at a fixed point in the engine cycle.

It is a feature of this invention that whether the synchronization comes from either of the above described sources, the phase relation between the engine cycle and the triggering point for the primary constant amplitude sweep generator may be varied as desired by the operator so that the cathode ray oscillograph sweep may be initiated at any selected point in the engine cycle. Thus, the single point synchronizing voltage input is converted to provide multipoint triggering of the sweep.

In accordance with features of this invention, the multiphase generator and the secondary sweep generator are connected to the primary sweep generator through a specially constructed potentiometer and switch. The potentiometer comprises a resistive phase resolver having a plurality of wiper arms connected to contacts of the switch such that the output of the multiphase generator, which may be mechanically coupled to the crankshaft of the engine, is converted to a single phase sine wave having a phase angle dependent upon the position of the potentiometer shaft. Thus, as the potentiometer wiper arms are rotated, the phase of the sawtooth wave output of the primary sweep generator is varied to initiate the sweep of the cathode ray oscillograph at different times in the engine cycle. Accordingly, the shaft position of the potentiometer can be used to identify engine functions which may be displayed as signals on the cathode ray oscillograph.

For single point triggering operation the specially constructed switch may be operated to disconnect the multiphase synchronizing generator from the potentiometer and to connect the secondary constant amplitude sweep generator to the potentiometer. Each synchronizing pulse applied from a single point in the engine cycle to the secondary sweep generator results in an output from the latter of a sawtooth waveform of constant amplitude regardless of the repetition frequencies of the synchronizing pulses. This constant amplitude sawtooth waveform is applied through the switch to the potentiometer. The phase angle of the potentiometer output voltage applied to the primary constant amplitude sweep generator, as determined by the rotational position of the potentiometer shaft, controls the time of initiation of the cathode ray oscillograph sweep with respect to the engine cycle.

Thus, by selective adjustment of the specially constructed switch, the phase relations between the engine cycle and the sweep triggering point may be varied as desired by the same potentiometer shaft so that the sweep may be initiated at any point on the engine cycle whether the synchronizing pulse is derived from a multiphase generator directly coupled to the engine or from a single point in the engine cycle.

The above and other features of novelty which characterize the invention are pointed out with particularity in the claims annexed to and forming a part of this specification. For a better understanding of this invention, however, its advantages and specific objects attained with its use, reference is had to the accompanying drawing and descriptive matter in which is shown and described a specific illustrative embodiment of the invention.

Referring now to the drawing there is shown a specific illustrative embodiment of the invention which comprises a potentiometer 10 and a six-circuit two-position switch 12. The constructions of the two sweep generating circuits, shown at the right and left of potentiometer 10 and switch 12, are substantially the same, each circuit comprising a sawtooth waveform sweep generator of the type adapted to produce an output sawtooth waveform of constant amplitude regardless of the repetition frequency of the synchronizing pulses applied to the circuit.

The primary sweep generating circuit is shown at the right side of potentiometer 10 and switch 12 and its output is adapted to be applied to the deflection plates of the cathode ray oscillograph in the engine analyzer. The secondary sweep generating circuit is shown at the left of potentiometer 10 and switch 12 and is adapted to be utilized when the synchronizing signals are applied to the analyzer in the form of pulses taken from a single point in the engine cycle.

Switch 12 is shown in position for synchronizing the sweep from a multiphase generator 14 which advantageously may be mechanically coupled to the engine to be tested, such as at the crankshaft thereof. The three conductors 16, 18 and 20 connected to the output of the three-phase generator 14 are connected to contacts 22, 24 and 26, respectively, of switch 12. Switch blade 28, switch blade 30 and switch blade 32 of switch 12 are connected to wiper arms 34, 36 and 38, respectively, of potentiometer 10 such that the three-phase voltages generated by generator 14 are applied to resistance 40 of potentiometer 10.

Potentiometer resistance 40 preferably is wound in annular form so that its winding ends 42 and 44 are positioned physically adjacent each other but, instead of being connected thereat, the winding ends are connected to switch blades 46 and 48, respectively, of switch 12. When switch 12 is positioned for receiving synchronizing voltages from generator 14, as shown in the drawing, winding ends 42 and 44 of potentiometer resistance 40 are connected together by means of a jumper 50 connected across switch contacts 52 and 54 of switch 12. Jumper 50 also is connected to contact 56 of switch 12 and to the control grid 58 of the input pulse shaping tube 60 of the primary sweep generator circuit. Ground return for potentiometer resistance 40 is made from potentiometer tap 62, and through switch blade 64 and switch contact 66 of switch 12.

Thus, it will be appreciated that the three-phase voltages generated by generator 14 as a result of engine rotation appear at wiper 38 of potentiometer 10 as a single phase sine wave. This single phase sine wave is applied to the input of the primary sweep generator circuit and serves as the synchronizing trigger voltage to enable the production of constant amplitude sweep voltage sawtooth waveforms from the latter.

In accordance with an aspect of the invention, the three wiper arms 34, 36 and 38 of potentiometer 10 are mechanically coupled to a shaft 68 so that the positions of the wiper arms in the potentiometer may be selectively varied as desired. Thus, the phase angle of the single phase sine wave applied to tube 60 of the primary sweep generating circuit may be varied dependent upon the position of shaft 68 for initiating the sweep output of the primary sweep generator at different times in the engine cycle. The position of shaft 68 thus can be used to identify engine functions which may be indicated by indicia 70 associated with a control knob 72 coupled to shaft 68.

The primary sweep generating circuit may take the form of any sweep generator of the constant amplitude type, that is, of the type adapted to provide a sawtooth wave output having a constant amplitude regardless of the repetition frequency of the input synchronizing pulses applied to the sweep generator. For purposes of illustration, the primary sweep generating circuit will be described as the constant amplitude sweep generator disclosed in my copending application Serial No. 624,049, identified above, but it will be readily understood by those skilled in the art that any other constant amplitude sweep generator may be utilized in the instant invention. The constant amplitude sweep generator shown in the drawing comprises amplifying and shaping tubes 60 and 74 which amplify and clip the input sine wave to produce a reasonably square wave at the anode 76 of tube 74. This square wave is differentiated by capacitor 78 and resistance 80 and the resulting differentiated pulses are fed through a diode 82 to trigger the monostable multivibrator 84 comprised of tubes 86 and 88.

The operation of multivibrator 84 produces a square pulse of constant duration and amplitude which appears at the anode 90 of tube 88 once during each engine cycle. This square pulse is integrated, by resistance 92 and capacitor 94, and is filtered, by the filter network comprising resistors 96 and 98 and capacitors 100 and 102, to provide on conductor 104 a control D.C. voltage having an amplitude proportional to engine speed.

The square pulses at the output of multivibrator 84 also are differentiated by capacitor 106 and resistor 108 and applied to the control grid 110 of tube 112. Tube 112 normally is biased below cut off by a voltage divider comprising resistors 114 and 116 connected between ground and negative potential source 120 so that anode current flows in tube 112 only during the relatively short time period of the positive going pips of the differentiated pulses.

The relatively large negative going pulse which appears at anode 122 of tube 112 is coupled through capacitor 124 to a voltage divider consisting of resistors 126, 128, 130 and 132 connected between positive potential source 134 and negative potential source 120. Screen grid 138 of tube 140 is connected to the junction of resistors 126 and 128 and suppressor grid 142 of tube 140 is connected to the junction of resistors 128 and 130. The negative going pulse applied to the voltage divider has the effect of momentarily lowering the potential to which suppressor grid 142 is returned which induces switching action in tube 140.

As explained in greater detail in my copending application Serial No. 624,049, identified above, the switching action consists of the termination of anode current flow but not screen current flow in tube 140. The resultant negative potential which appears at anode 144 of tube 140 is reflected through the control grid 146 and the cathode 148 of tube 151 to apply the suddenly increased positive potential at the cathode connected terminals of charging capacitors 150 and 152. This sudden increase serves as the vertical portion of the sweep sawtooth waveform. This waveform may be taken between cathode resistors 154 and 156 of tube 151 to be applied to the oscilloscope deflection plates.

The negative going pulse which drove suppressor grid 142 of tube 140 to anode cut off is of very short duration and immediately after its removal the supressor grid returns to its original potential and allows anode current to flow once again. Consequently, anode 144 drops in potential taking with it control grid 146 and cathode 148 of tube 151 and, through charging capacitors 150 and 152, the control grid 158 of tube 140. This action tends to limit current flow in tube 140 and control grid 158 comes to rest at a potential slightly negative to cathode 160.

After the rapid rise in potential of cathode 148 of tube 151, a current flow ensues from the integrator network through its output conductor 104 and resistor 162 to the grid connected terminals of the charging capacitors 150 and 152. This current flow causes a rise in potential on control grid 158 with a consequent lowering of potential of anode 144, control grid 146 and cathode 148 in the manner described above.

Thus, it will be appreciated that every increase in potential at the switch connected terminals of the charging capacitors results in a decrease in potential on the cathode connected terminals of the charging capacitors. This action continues in a continuous flow of current into the charging capacitors until the next negative going pulse is applied to suppressor grid 142 of tube 144 to once again terminate anode flow therein. Since this current flows into the charging capacitors across a nearly constant potential difference, the current remains nearly constant in amplitude to produce a sawtooth voltage slope which is linear to within a very small degree of tolerance. It will be appreciated that since the rate of the current flow into the charging capacitors is inversely proportional to the integrator voltage of conductor 104, and as the latter is proportional to the synchronizing repetition rate, that is, the engine speed, the sweep rate is adjusted automatically to maintain the sawtooth waveform output of constant amplitude regardless of variations in engine speed.

The sweep range may be controlled by operation of switch 164 connected to charging capacitors 150 and 152. Thus, switch 164 is positioned to place both capacitors in parallel when a slow sweep is desired or, alternatively, is positioned to take capacitor 150 out of the circuit, leaving only capacitor 152, when a fast sweep is desired.

Thus far the invention has been described to show the manner in which the primary sweep generator is synchronized by the multiphase output voltages produce by A.C. generator 14. To synchronize the primary sweep generator from a single pulse obtained at a fixed point in the engine cycle, the circuit shown as the secondary sweep generator is utilized.

For a single point triggering operation, switch 12 is rotated one position counterclockwise from the position shown in the drawing such that switch blade 64 is connected with contact 170, switch blade 28 is connected with contact 172, switch blade 46 is connected with contact 174, switch blade 30 is connected with contact 176, switch blade 48 is connected with contact 178, and switch blade 32 is connected with contact 56. With this switch position, the winding ends 42 and 44 of potentiometer resistance 40 are disconnected from each other and are connected to points 180 and 182, respectively, which inserts potentiometer resistance 40 in the cathode circuit of tube 184. The tap 62 on potentiometer resistance 40 is left open as are potentiometer wiper arms 34 and 36. Potentiometer wiper arm 38 is connected to control grid 58 of tube 60 which is the input to the primary sweep generator.

The amplitude of the single pulse synchronizing signal applied to input terminal 186 is controlled by the setting of potentiometer 188. A bridge network 190, comprising diodes 192, 194, 196 and 198, has its input connected to potentiometer 188 and its output connected across the primary windings of transformer 200 such that pulses of the same polarity are delivered to the control grid 202 of tube 204 regardless of the polarity of the input pulses at terminal 186. As is well understood by those skilled in the art the operation of input transformer 200 solves the problem of biasing input tube 204 for either polarity of input pulses.

The synchronizing pulses applied to terminal 186 are amplified and shaped by tubes 204 and 206 and are applied in differentiated form through diode 208 to trigger multivibrator 210 comprised of tubes 212 and 214. The regular occurrence of a single output pulse at the output of multivibrator 210 for each cycle of the engine results in the generation of a sawtooth voltage waveform at cathode 216 of tube 184 in the manner described above with regard to the operation of the primary sweep generator. Thus, the output of multivibrator 210 is applied through tube 218 to momentarily trigger tube 220 to provide a switching action through the feed back circuits comprising tube 184 and charging capacitor 222. The multivibrator output pulses also are integrated and filtered to produce at conductor 224 a D.C. voltage having an amplitude proportional to the input pulse repetition frequency. Thus, the sawtooth voltage waveform at the cathode 216 of tube 184 is automatically regulated to constant amplitude regardless of engine speed in the same manner as explained for the primary sweep generator.

It is to be noted that the negative going slope generated at the cathode 216 of tube 184 appears at the potentiometer wiper arm 38 which is now connected to control grid 58 of input tube 60 of the primary sweep generator. The coincidence of the sawtooth potential at wiper arm 38 and ground potential, with respect to the engine cycle, depends on the setting of shaft 68 coupled to wiper arm 38. In the practice of the invention, potentiometers 226 and 228 connected in the cathode circuit of tube 184 are adjusted so that point 180 is coincident with ground at the top of the slope and point 182 is coincident with ground at the bottom of the slope. Thereafter there is a linear relation between the rotational position of shaft 68, and the time of initiation of the analyzer sweep voltage with respect to the engine cycle. Therefore, by placing switch 12 in the proper position the same circuit components, comprising the potentiometer, the wiper arms, the potentiometer shaft, etc., can be used for identification of signals representing engine functions which may be displaced on the engine analyzer cathode ray oscillograph.

It will be noted that although the primary sweep generator and the secondary sweep generator are basically identical certain minor differences exist between the two circuits. For example, only one charging capacitor is used between the cathode 216 of tube 184 and the control grid 230 of tube 220 since only one slope is required here. Other minor differences may be made but it is preferred that these two circuits be kept similar so that the same production parts and methods can be used on either. Also, this is desirable so that the two circuits can be made to be interchangeable in the field.

Thus, I have shown and described an engine analyzer sweep network having features for trigger voltage phasing and amplitude control. Specifically, I have shown an engine analyzer sweep network in which the sweep can be synchronized with the engine either from a three-phase A.C. generator associated with the engine or from a single pulse which occurs at a fixed point in the complete engine cycle. It will be appreciated that while being synchronized from either of these two sources, the phase relations between the engine cycle and the sweep triggering point may be varied continuously as desired by the operator so that the sweep may be initiated at any point in the engine cycle. Manifestly this is highly advantageous in identifying signals representing engine functions which may be displayed on the analyzer cathode ray oscillograph.

It will be understood by those skilled in the art that modifications may be made in the construction and arrangement of the parts of the above described synchronizing circuit for engine analyzer sweep network without departing from the real purpose and spirit of the invention and that it is intended to cover by the appended claims any modified forms of structures, circuits or use of equivalents which reasonably may be included within their scope.

I claim:

1. Apparatus for generating the sweep for a cathode ray oscillograph in an engine analyzer comprising a primary constant amplitude sweep generator, a secondary constant amplitude sweep generator, a source of multiphase voltages directly coupled with the engine and responsive to the operation thereof for applying multiphase voltages in accordance with the engine speed upon a plurality of output conductors, a source of synchronizing voltage pulses associated with the engine and operative to produce a single pulse for each engine cycle, a potentiometer having a resistance and a plurality of wiper arms and switch means adapted in one position to connect each of said plurality of conductors to a different one of said plurality of wiper arms and to connect the potentiometer resistance to said primary constant amplitude sweep generator for applying said multiphase voltages as a single phase voltage to said primary constant amplitude sweep generator, and adapted in a second position to connect said secondary constant amplitude sweep generator to said potentiometer resistance and to connect one of said wiper arms to said primary constant amplitude sweep generator for applying the constant amplitude sweep output of said secondary generator to said primary generator, and means connected to said wiper arms for selectively varying their position on said resistance to vary the phase of the sweep output of said primary constant amplitude sweep generator.

2. Apparatus for generating the sweep for a cathode ray oscillograph in an engine analyzer comprising a primary constant amplitude sweep generator, a source of multiphase voltages directly coupled with the engine and responsive to the operation thereof for applying multiphase voltages of frequency determined by engine speed upon a plurality of conductors, a source of synchronizing voltage pulses associated with the engine and responsive to the operation thereof for producing a single pulse for each engine cycle, a secondary constant amplitude sweep generator, means for applying said synchronizing pulses to said secondary constant amplitude sweep generator to produce an output sweep voltage having a constant amplitude over the range of engine speeds, a potentiometer having a resistance and a plurality of wiper arms, switch means for selectively connecting, in one position, each of said conductors to a different one of said wiper arms and said potentiometer resistance to said primary constant amplitude sweep generator, and, in a second position, the output of said secondary constant amplitude sweep generator to said potentiometer resistance and one of said wiper arms to said primary constant amplitude sweep generator whereby said primary constant amplitude sweep generator may be selectively synchronized with either said source of multiphase voltages or said source of synchronizing voltage pulses.

3. Apparatus for generating the sweep for a cathode ray oscillograph in an engine analyzer in accordance with claim 2 further comprising actuatable means coupled to said wiper arms for selectively positioning said wiper arms on said potentiometer resistance to vary the phase of the output sweep voltage from said primary constant amplitude sweep generator.

4. Apparatus for generating the sweep for a cathode ray oscillograph in an engine analyzer comprising a primary constant amplitude sweep generator, a source of multiphase voltages directly coupled with the engine and responsive to the operation thereof for applying multiphase voltages in accordance with the engine speed upon a plurality of output conductors, a potentiometer having a resistance and a plurality of wiper arms, switch means adapted to connect each of said plurality of conductors to a different one of said plurality of wiper arms and to connect the potentiometer resistance to said primary constant amplitude sweep generator for applying said multiphase voltages as a single phase voltage to said primary constant amplitude sweep generator, means for selectively positioning said wiper arms on said potentiometer resistance to vary the phase of said single phase voltage, a source of synchronizing voltage pulses associated with the engine whereby a single pulse is produced for each engine cycle, a secondary constant amplitude sweep generator, means for applying said synchronizing pulses to said secondary constant amplitude sweep generator to produce an output sawtooth waveform having a constant amplitude over the range of engine speeds, and switch means adapted to connect said output sawtooth waveform to said potentiometer resistance and to connect one of said wiper arms to said primary constant amplitude sweep generator whereby the phase of the input voltage to said primary constant amplitude sweep generator may be varied in accordance with the position of said one wiper arm on said potentiometer resistance.

5. Apparatus for generating the sweep for a cathode ray oscillograph in an engine analyzer comprising a constant amplitude sweep generator, a source of multiphase voltages directly coupled with the engine and responsive to the operation thereof for producing multiphase voltages of frequency determined by engine speed, a source of synchronizing voltage pulses associated with the engine and responsive to the operation thereof for producing a single pulse for each engine cycle, a multicontact, two-position switch, a potentiometer connected to said switch, said potentiometer having a resistance and a plurality of wiper arms, means connecting said source of multiphase voltages to said switch whereby the latter in one position causes said multiphase voltages to be applied to said wiper arms and the resistance to be connected to the input of said constant amplitude sweep generator, and means connecting said source of synchronizing voltages to said switch whereby the latter in a second position causes synchronizing voltages to be applied to said resistance and one of said wiper arms to be connected to the input of said constant amplitude sweep generator.

6. Apparatus for generating the sweep for a cathode ray oscillograph in an engine analyzer in accordance with claim 5 which further comprises actuatable means coupled to said wiper arms and adapted when actuated to vary the phase of the input voltage to said constant amplitude sweep generator in accordance with the position of said wiper arms on said potentiometer resistance.

7. Apparatus for generating the sweep for a cathode ray oscillograph in an engine analyzer in accordance with claim 5 wherein said means connecting said source of synchronizing pulses to said switch comprises a second constant amplitude sweep generator adapted to produce a constant amplitude sawtooth voltage output for each synchronizing pulse applied thereto.

8. Apparatus for generating a sweep for a cathode ray oscillograph in an engine analyzer comprising a primary sawtooth wave generator adapted to produce a sweep voltage of relatively constant amplitude over a range of engine speeds, a multiphase signal generator directly coupled with the engine and adapted to generate multiphase synchronizing signals for each cycle of the engine, a source of input synchronizing pulses associated with the engine whereby a single pulse is produced for each cycle of the engine, a secondary sawtooth wave generator connected to said source for producing a voltage of constant amplitude over a range of engine speeds, a potentiometer having a resistance and a plurality of wiper arms, two positions switching means adapted, when operated to one position thereof, to apply said multiphase synchronizing signals to said potentiometer wiper arms and to connect said potentiometer resistance to said primary sawtooth wave generator and, when operated to the other position thereof, to apply the sawtooth voltage output of said secondary sawtooth wave generator to said potentiometer resistance and to connect one of said potentiometer wiper arms to said primary sawtooth wave generator, and means for selectively varying the position of the potentiometer wiper arms on the potentiometer resistance whereby the phase relation between the engine cycle and the output from said primary sawtooth wave generator may be adjusted as desired to initiate the oscillograph sweep at any point on the engine cycle.

9. Apparatus for generating a sweep for a cathode ray oscillograph in an engine analyzer comprising a primary sweep generator adapted to produce sawtooth voltages of relatively constant amplitude over a range of triggering signal repetition frequencies, a source of input synchronizing pulses directly coupled with the engine whereby a single pulse is produced for each cycle of the engine, a secondary sawtooth voltage generator connected to said source for producing a voltage of relatively constant amplitude over a range of engine speeds, a potentiometer having a resistance and at least one wiper arm, means for applying the sawtooth voltage output of said secondary sawtooth voltage generator to said potentiometer resistance and to connect one potentiometer wiper arm to said primary sweep generator and means for selectively varying the position of said potentiometer wiper arm on the potentiometer resistance whereby the phase relation between the engine cycle and the output from said primary sweep generator may be adjusted as desired to initiate the sweep at any point on the engine cycle.

References Cited in the file of this patent

UNITED STATES PATENTS

| | | |
|---|---|---|
| 2,085,940 | Armstrong | July 6, 1937 |
| 2,410,721 | Dome | Nov. 5, 1946 |
| 2,414,486 | Rieke | Jan. 21, 1947 |
| 2,430,154 | Woodward | Nov. 4, 1947 |
| 2,645,751 | Byerlay | July 14, 1953 |
| 2,717,942 | Andrews | Sept. 13, 1955 |
| 2,778,988 | Pihl | Jan. 22, 1957 |
| 2,785,215 | Yetter | Mar. 12, 1957 |

FOREIGN PATENTS

| | | |
|---|---|---|
| 740,087 | Great Britain | Nov. 9, 1955 |